May 11, 1926. Re. 16,347

H. R. BLISS

METHOD OF SEALING FIBER SHIPPING CASES

Original Filed Sept. 19, 1921 3 Sheets-Sheet 1

INVENTOR.
Herbert R. Bliss
BY
Stuart C. Barnes
ATTORNEY.

May 11, 1926. Re. 16,347

H. R. BLISS

METHOD OF SEALING FIBER SHIPPING CASES

Original Filed Sept. 19, 1921 3 Sheets-Sheet 2

INVENTOR.
Herbert R. Bliss
BY
Stuart C. Barnes
ATTORNEY.

May 11, 1926. Re. 16,347

H. R. BLISS

METHOD OF SEALING FIBER SHIPPING CASES

Original Filed Sept. 19, 1921 3 Sheets-Sheet 3

INVENTOR.
Herbert R. Bliss
BY
Stuart C. Barnes
ATTORNEY.

Reissued May 11, 1926. Re. 16,347

UNITED STATES PATENT OFFICE.

HERBERT R. BLISS, OF NIAGARA FALLS, NEW YORK.

METHOD OF SEALING FIBER SHIPPING CASES.

Original No. 1,452,588, dated April 24, 1923, Serial No. 501,620, filed September 19, 1921. Application for reissue filed January 12, 1925. Serial No. 2,029.

This invention relates to a method of sealing fiber shipping cases, and has for its object a method of sealing that permits the adoption of a fiber case of a minimum quantity of material. At the same time the sealing is very secure, being along two edges of the box and along the middle. This is a considerable improvement over ordinary methods of sealing.

This application is a continuation in part of application filed September 7th, 1920, No. 408,638, which has matured into Patent No. 1,414,067, dated April 25, 1922.

Heretofore it has been customary to use what is known as the slotted fiber shipping case. This is a shipping case in which the blank is made of a single piece. Each of the side walls of the blank having relatively wide flaps; when these flaps are folded over they form the bottom and top of the case. These overlapped flaps have been either stitched together or else glued together with a suitable paste or glue. Sometimes they are secured together by a pasting strip. This type of box utilizes a great amount of material as the flaps attached to the end walls are the same length as the flaps attached to the side walls.

Figure 1:
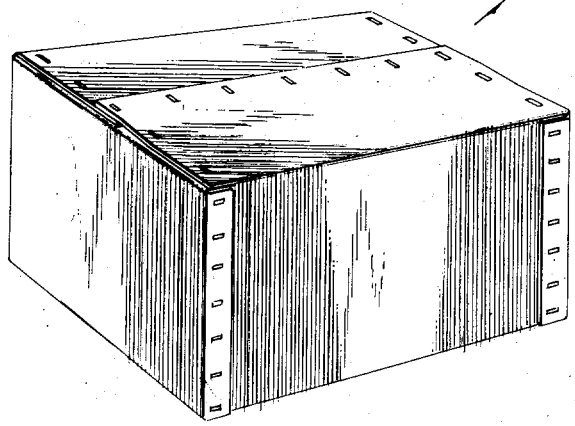
Fig. 1 is a perspective of a shipping case sealed by this method.

It is the object of the present invention to provide a method of sealing which permits the use of a shipping case which has very short flaps attached to the end walls, which results in a considerable saving in the material from which these boxes are constructed, anywhere from 15% to 20%, depending upon the shape and dimensions of the case. My method of sealing the flaps can be used with a box made from a single blank the same way that the old slotted container is made, but obviously there will be a great waste of material, in fact, just as great as with the old slotted container, for the shallow flaps on the end walls although taking less material would involve a great waste this way that would make the material cost of the container precisely that of the old slotted container, by using separate end walls that are stitched on in the manner shown in Figs. 1 and 2, this waste is avoided, the two long flaps on the bottom of the regular slotted container are eliminated, and at the same time a stronger case is secured because the edges at the ends of the case are all reinforced by a double thickness.

Figure 2:
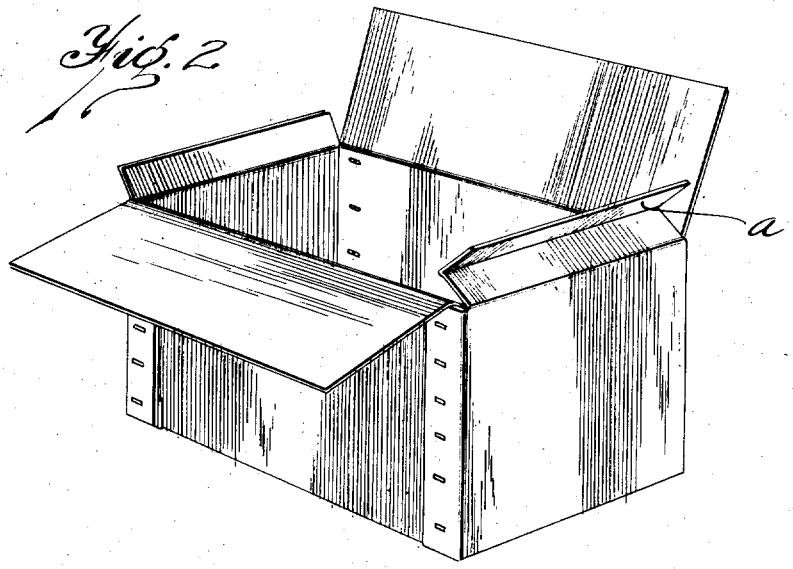
Fig. 2 is a perspective of a preferred form of sealing case before the same is sealed.
Figure 3:
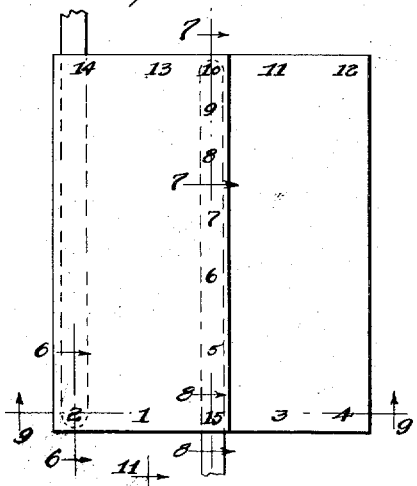
Fig. 3 is a plan view showing one specific method of sealing. (The order in which the stitches are driven is indicated by the numerals.)
Figure 6:
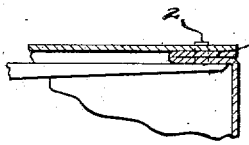
Fig. 6 is a fragmentary section taken on the line 6—6 of Fig. 3.

Now referring to Fig. 3, the method by which this case is stitched can be followed. The stitches are taken in the order indicated by the numerals. The flap at one end is a double flap *a* and so designated in Fig. 2. The first thing to do is to place the blade anvil under the double flap as shown in Fig. 6, driving the stitches 1, 2, 3 and 4. We speak of placing the anvil under the double flap. Of course, it will be understood in actual practice that the anvil is fixed on a wire stitching machine and the case is manipulated about the anvil. However, the process could conceivably be achieved by hand by inserting an anvil and manipulating it in various ways to be described.

Figure 7:
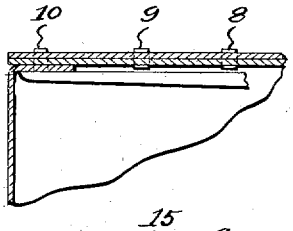
Fig. 7 is a section on the line 7—7 of Fig. 3.
Figure 8:
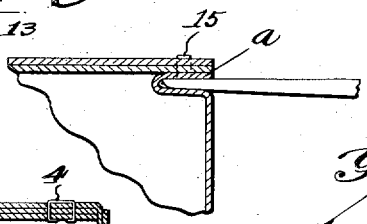
Fig. 8 is a section taken on the line 8—8 of Fig. 3.

After the stitches 1, 2, 3 and 4 have been clinched by the anvil under the double flap, the position of the case with respect to the anvil is reversed, the anvil being under the overlapping side wall flaps, as shown in the dotted lines in Fig. 3, and as shown by the section illustrated in Fig. 7. With the parts thus positioned, the case is pushed along the anvil and the stitches 5, 6, 7, 8, 9 and 10 are taken. Then the case is shifted to one side and the stitches 11 and 12 are taken, and the case is shifted to the other side and the stitches 13 and 14 taken. Then the case is pulled entirely off the anvil and the anvil is inserted between the folds of the double flap *a*, as is shown in Fig. 8, and the stitch 15 is taken. This makes a very secure fastening for every joint where the flaps meet, as the parts are securely stitched together.

Figure 4:
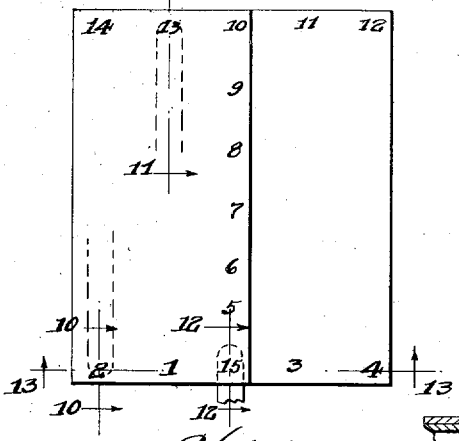
Fig. 4 is a plan view in a like manner, showing the order in which the stitches are driven into a shipping case with only a single flap at each end.
Figure 9:
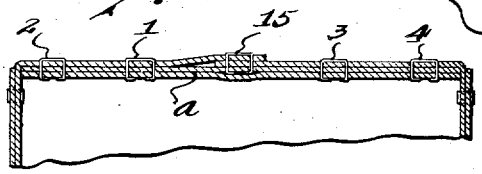
Fig. 9 is a section taken on the line 9—9 of Fig. 3.
Figure 10:
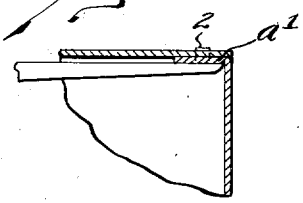
Fig. 10 is a section on the line 10—10 of Fig. 4.
Figure 11:
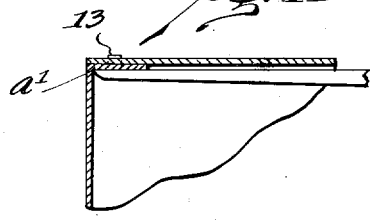
Fig. 11 is a section on the line 11—11 of Fig. 4.
Figure 13:
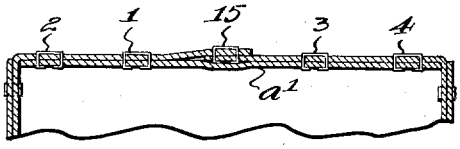
Fig. 13 is a section on the line 13—13 of Fig. 4.
Figure 12:
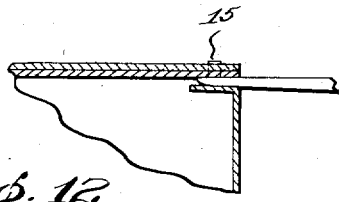
Fig. 12 is a section on the line 12—12 of Fig. 4.

The second method illustrated in Fig. 4 is precisely the same as that already described except that instead of a double flap at one end a single flap $a^1$ is used, as is shown in Fig. 10, also Fig. 13. This eliminates the double flap and results in a small saving in material, but it does not result in quite as good a closure (compare Fig. 9 and 13). In Fig. 9 there is no chance to bet into the case at all, whereas in Fig. 13 the two side wall flaps are sealed together by the stitch 15, but they are not sealed to the end wall flap $a^1$ between the stitches 1 and 3.

Figure 5:
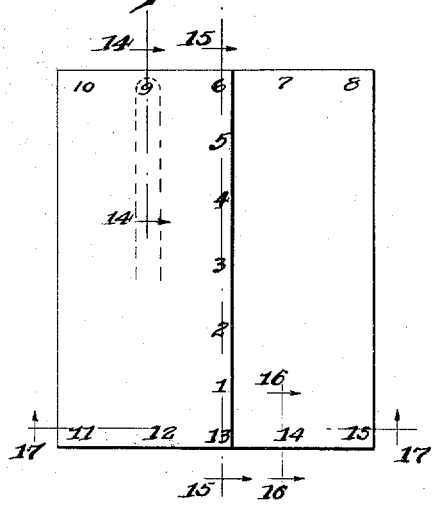
Fig. 5 is a plan view of a case showing an alternative method of sealing.
Figure 14:
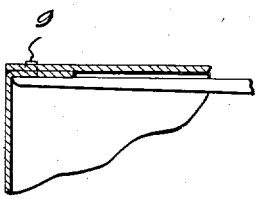
Fig. 14 is a section on the line 14—14 of Fig. 5.
Figure 15:
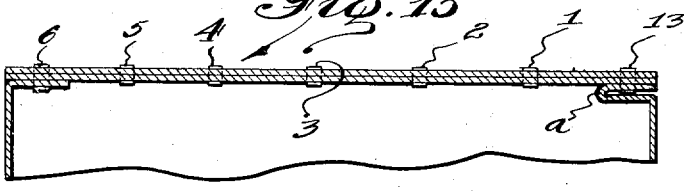
Fig. 15 is a section on the line 15—15 of Fig. 5.
Figure 17:
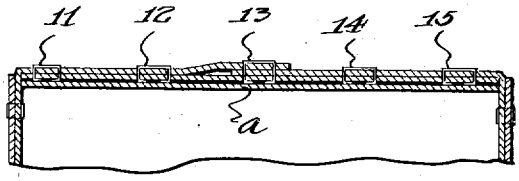
Fig. 17 is a section on the line 17—17 of Fig. 5.
Figure 16:
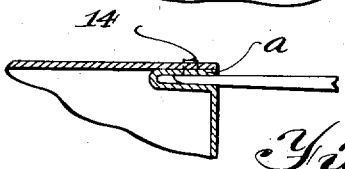
Fig. 16 is a section on the line 16—16 of Fig. 5.

In the third specific method illustrated in Fig. 5, and the sections shown in Figs. 14 and to 17 inclusive, the stitching is first done along the line where the wide flaps meet, then the wide flaps are stitched to the narrow flap at one end and thereafter the stitches 11 to 15 inclusive are taken by running the anvil between the flaps of the double flap clear across from one side to the other.

It will be understood that my process can be used for fiber shipping cases, corrugated board, or any of the equivalent materials that are used. It will also be apparent that rivets can be used in place of wire stitches and that in fact thread stitches or other positive fastening means can be used in place of the wire stitches. I make these statements simply to show that my invention is not limited to the specific construction shown, although in the claims in order to make the reference definite and unambiguous it may be necessary to refer to some of the elements in more or less specific language.

It will also be noted that aside from convenience, it does not make any particular difference in what order the stitches 5 to 12 in Figs. 3 and 4 are taken. In one type of my new method, a sort of T arrangement of stitches is taken on one end and down the line of meeting of the overlapping flaps. In the methods shown in Figs. 3 and 4, the flaps at the end of the case opposite the bar of the T have been stitched securely together before the T stitching is completed and in the actual preferred form before the T stitching is commenced. With such a double form of flap as is shown in Fig. 2, an alternative successful method such as shown in Fig. 5 can be practiced, namely the anvil may be inserted between the flaps on the double flap *a* and the stitches in the end of the case opposite the bar of the T taken after the T stitching has been completed.

It will be apparent that the same general method of sealing can be used with boxes in which the outer flaps are not exactly the same size, as for instance where one is small and the other relatively larger. Hence, in such a case the stitching can be performed in precisely the same way except that obviously there would be a less number of stitches or no stitches on one side of the line of stitches along the overlapped outer flaps. Or it will be apparent that measurably good results could be accomplished even in such a box as shown in the drawings where the two outer flaps are substantially the same width but omitting the stitches at one side of the line of stitches along the overlapping outer flaps.

This method is essentially one in which an anvil or clinching member performs an essential part. It is the manipulating of this anvil and leaving the proper place for it to be inserted and withdrawn that ordains the order of the steps. The flaps could be pasted together but with the flaps as shallow as these, this would be a wholly impractical thing from the standpoint of commercial usage.

What I claim is:

1. The method of sealing a shipping case having flaps on the side and end walls, which consists of turning in one pair of opposed flaps, overlapping the other pair of opposed flaps over the first-mentioned flaps and each other, and taking a T arrangement of stitches with the stem of the T along the line of overlap of the overlying flaps and the bar of the T at one end of the case where the overlying flaps overlap the underlying flap, the opposite end of the case having the overlying flaps stitched to the underlying flap along the end of the case whereby the entire stitching forms an H.

2. The method of sealing a shipping case having flaps attached to the side and end walls, which consists in turning in the flaps of two opposed walls and turning in and overlapping the flaps of the other two opposed walls to overlie the first-mentioned flaps, the insertion of a blade anvil over one underlying flap at one end and under the overlapping flaps and under the underlying flap at the other end, and the taking of a T arrangement of stitches with the aid of said anvil to secure the overlapping flaps to the underlying flap at one end and to each other along the overlapping zone, the opposite end of the case being sealed by stitching the overlapping flaps to the underlying flap.

3. The method of sealing a shipping case with flaps on the side and end walls, which consists in turning in a pair of opposed flaps and then overlapping the two other opposed flaps to overlie the first-mentioned flaps, the stitching of the overlapping flaps to the underlying flap at one end but leaving an opening between the overlapping flaps and the said underlying flap at the center, then the stitching of the overlapped flaps to each other along their line of overlap and to the underlying flap at the opposite end of the case by means of an anvil inserted in the opening left between the overlying flaps and the first-mentioned underlying flap.

4. The method of sealing a shipping case having pairs of opposed flaps on its side and end walls, which consists in turning in two opposed flaps and then turning in and overlapping the other two opposed flaps to overlie the first-mentioned flaps, the insertion of an anvil between the overlapping flaps and one underlying flap and locating the clinching portion under the other underlying flap and driving fasteners or stitches through the overlapping flaps into such last-mentioned underlying flap but leaving a free space between the overlapping flaps and the said underlying flap at the center of the case, then the insertion of a blade anvil in such selected space, and the driving of fasteners or stitches in a T arrangement along the overlapping flaps at their line of overlap to form the stem of the T and along the overlapping flaps and the underlying flap at the opposite end of the case and then withdrawing the anvil through the selected space.

5. The method of sealing a shipping case having a narrow pair of flaps on the end walls of the shipping case and a wide pair of flaps on the side walls of the shipping case, which consists in turning in the narrow pair of flaps and then overlapping the wide pair of flaps and causing the same to overlie the narrow flaps, taken a T plan of stitches or clinching fasteners along the line of the overlapping flaps and along one end of the box with the overlapping flaps overlying the narrow flap at that end by using a blade anvil with its clinching portion underlying the parts to be clinched, the opposite end of the case being secured together by driving metallic fasteners through the overlapping flaps and the underlying narrow flap and clinching the same.

6. The method of sealing a shipping case having opposed flaps on the side and end walls of the case, one of said flaps being a double or turned-back flap, which consists in taking a T arrangement of stitches with a blade anvil to clinch the same along the line of the overlap of the overlapping flaps and along one end of the box where the overlapping flaps overlap the underlying flap, the overlapping flaps having been secured to the other underlying flap at the opposite end of such underlying flap, and finishing the sealing operation by placing the anvil between the two portions of the double flap and driving and clinching the stitch through the overlapping flaps and one of the portions of the double flap.

7. The method of sealing a shipping case having side and end walls with opposed flaps, one of which is a double flap, which consists in turning in the pair of flaps including the double flap and doubling back the outer portion of such double flap, and then turning in and overlapping the other pair of flaps over each other and the first pair of flaps, then inserting a blade anvil under the inner portion of the double flap and driving stitches or fasteners into the overlying pair of flaps and the ends of such underlying flap, leaving a space at the center, then inserting an anvil through such selected space and driving stitches into the overlying flaps to fasten them together and to the underlying flap at the opposite end, then withdrawing the anvil and inserting it at the center in between the outside and inside portions of the double flap and driving a stitch through the overlapped flaps and the outer portion of the double flap.

8. The method of sealing a shipping case having opposed flaps on the side and end walls, one of which flaps is a double flap, which consists in turning in the pair of flaps which includes the double flap and turning back the outer portion of such double flap, the turning in of the other flaps to overlap each other and overlie the first-mentioned pair of flaps, the insertion of a blade anvil under the overlapping flaps and over the single underlying flap and causing the clinching portion of such blade anvil to underlie the inner portion of the double underlying flap, and the stitching of the overlapping flaps to the underlying double flap but leaving a free space at the center of such double underlying flap, then the withdrawal and insertion of the anvil at the opposite end of the case over the two portions of the double underlying flap and under the overlapped flaps, and the stitching along the overlapped flaps at their line of overlap and also the taking of stitches with the clinching portion of the anvil under the single underlying flap to fasten the overlying flaps to the same along this end of the case, and finally the withdrawal of the anvil and the insertion of the anvil at the center of the case between the two portions of the double flap, and the taking of a stitch through the overlapped flaps and the outer portion of the double flap.

9. The method of sealing a shipping case having flaps on the side and end walls, which comprises the turning in of said flaps, the stitching of one pair of opposed flaps along their meeting edges and one of such flaps at its two ends to the two other flaps by inserting a blade anvil under the flaps and, in making one of the lines of stitches, leaving an unstitched portion to permit the insertion of the blade anvil in performing some of the stitching.

10. The method of sealing a shipping case having flaps on two of the opposed walls and other flaps that are arranged to meet which are located on the other side walls, which said method comprises the turning in first of the first-mentioned flaps as the underlying flaps, and stitching the overlying flaps to the underlying flap at one end of the box and then inserting the anvil from said stitched end and stitching the overlying flaps to the underlying flap at the opposite end, and in these operations also stitching the overlying flaps together along their meeting edges.

11. The method of sealing a shipping case having flaps on two of the opposed walls and two cover members which are arranged to overlap, which method consists in turning in the first-mentioned flaps and the two cover members, and the insertion of a blade anvil in one end and stitching the overlying cover members to the underlying flap at the opposite end, then the withdrawal of the anvil and the insertion of the same at the stitched end and the stitching of the overlying cover members to the underlying flap at the other end, and during one of these two operations the stitching of the overlying cover members together where they overlap.

12. The method of sealing a shipping case having on two opposed walls narrow flaps and on the other two walls cover members that are arranged to overlap, which method consists in turning in the narrow flaps and the other two cover members to overlap, the insertion of a blade anvil under the flaps and the stitching of the cover members along their meeting edges and along the two ends of one of the cover members to the two said flaps, in one of the first stitching operations an unstitched space being left to permit the subsequent insertion of the anvil to complete one of the later stitching operations.

13. The method of sealing a shipping case having flaps on two of the opposed walls and other flaps that are arranged to meet which are located on the other side walls, which said method comprises the turning in of the first mentioned flaps as the underlying flaps, and then turning in of the overlying flaps and stitching the same to the underlying flap at one end of the case by an anvil inserted under the overlying flaps and over the other underlying flap, but leaving an unstitched portion, and then the stitching of the overlying flaps to the second underlying flap by inserting the anvil through the already stitched end at the unstitched portion which has already been left.

14. The method of sealing a shipping case having a closure made up of several overlying and underlying members, which comprises inserting an anvil and stitching the overlying member or members to the underlying member across one end but leaving an unstitched portion, and then inserting a blade anvil at such stitched end through the unstitched portion and stitching the overlying member or members to the underlying member at the opposite end.

15. The method of sealing a shipping case having a closure made up of several overlying and underlying members, which comprises inserting an anvil, stitching the overlying and underlying members together across one end, then inserting a blade anvil in the stitched end between the overlying and underlying members and stitching the overlying and underlying members together at the opposite end of the case.

In testimony whereof I have hereunto set my hand.

HERBERT R. BLISS.